April 10, 1956     A. E. ROACH     2,741,016
COMPOSITE BEARING AND METHOD OF MAKING SAME
Filed July 8, 1953
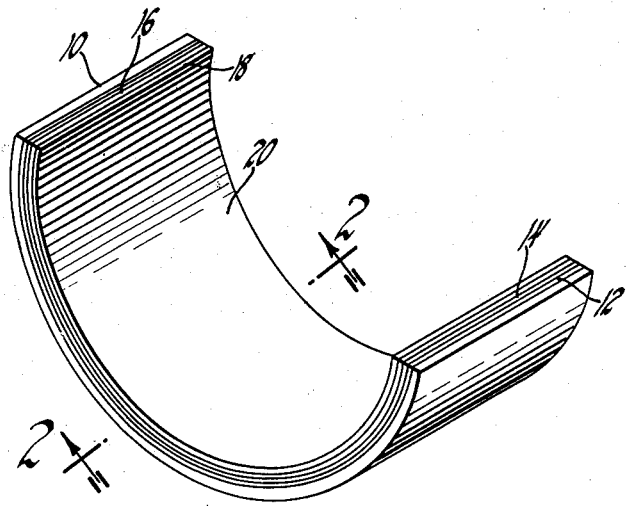
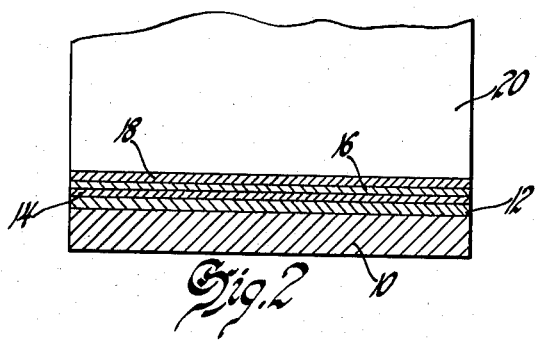
INVENTOR
Arvid E. Roach
BY
AT TORNEY

United States Patent Office 2,741,016
Patented Apr. 10, 1956

2,741,016
COMPOSITE BEARING AND METHOD OF MAKING SAME

Arvid E. Roach, Detroit, Mich., assignor to General Motors Corporation, Detroit, Mich., a corporation of Delaware Application July 8, 1953, Serial No. 366,759

10 Claims. (Cl. 29—149.5)

This invention relates to bearings and more particularly to aluminum and aluminum alloy bearings having a bearing surface of another metal or alloy coextensively bonded thereto and method of making the same.

The primary object of this invention is to provide an improved composite type aluminum or aluminum alloy bearing having a wear layer or bearing surface of another metal, preferably of a bearing metal such as a lead-base alloy.

In carrying out the above object it is a further object in some cases to provide an improved bearing wherein the aluminum or aluminum alloy is coextensively bonded to and supported by a strong metal backing member such as steel or the like.

A further object is to provide an aluminum type bearing having improved bearing properties when employed in high speed applications or other applications where bearing score resistance is a primary consideration.

A still further object of the invention is to provide an improved aluminum or aluminum alloy bearing which includes aluminum in a major portion together with smaller portions of aluminum alloying ingredients wherein one surface of the bearing has a thin layer of corrosion-resistant bearing metal coextensively bonded thereto, said bearing metal being selected from the group consisting of lead-tin; lead-tin-silver; lead-tin-copper; lead-indium, and other conventional bearing materials wherein the percentages thereof in the bearing alloy may vary in accordance with the specific use of the bearing. Further objects and advantages of the present invention will appear more fully from the following description.

Aluminum and aluminum alloy bearings have in recent years shown considerable promise in heavy duty applications wherein a bearing having high strength under compressive load, high melting point, and good bearing properties, is desired. Pure aluminum has been found satisfactory in many instances as have aluminum alloys including cadmium, silicon, etc. A preferred composition range of such alloys is:

| | Percent |
|---|---|
| Silicon | 3.5 –4.5 |
| Cadmium | .75–1.40 |

Remainder substantially all aluminum

A broad range of ingredients is:

| | Percent |
|---|---|
| Silicon | 1 –10 |
| Cadmium | .25– 5 |

Remainder substantially all aluminum

More recently, aluminum and aluminum alloys on steel bearings have been used, which bearings are of a replaceable character and may be used interchangeably in internal combustion engines with the conventional type of babbitt on steel bearings and the like. These bearings may be made in accordance with various processes disclosed in patents and copending applications assigned to the present assignee. These patent and serial numbers are: 2,490,543—Schultz et al.; 2,490,548—Schultz et al.; 2,490,549—Schultz et al., and S. N. 652,470—Schultz et al., filed March 6, 1946.

In some cases, it is highly desirable to provide a bearing metal working surface on the aluminum or aluminum alloy bearing. This bearing metal preferably is a corrosion-resistant lead-base alloy such as a lead-tin or lead-tin-copper alloy used in a thin layer coextensively bonded to the aluminum or aluminum alloy. This bearing alloy layer provides certain characteristics that are highly desirable and at the same time is of such a slight thickness that the strength, rigidity, conformability and embeddability of the aluminum or aluminum alloy bearing metal, to which it is bonded, is fully available.

Such a bearing has surface characteristics similar to the usual type of lead-base alloy bearing together with a strong aluminum or aluminum-base alloy backing which is satisfactory for carrying heavy loads. When the bearing alloy layer wears through in localized areas due to deflection, misalignment, or for other causes the aluminum or aluminum alloy itself is a good bearing material and carries on. In all cases, the aluminum or aluminum alloy may be a bearing per se or may have a steel backing bonded thereto. Typical of commercial steels which may be advantageously employed as backing for aluminum or aluminum alloy bearings in accordance with this invention are such mild low carbon steels as SAE 1010, SAE 1008, and SAE 1030.

I have now discovered that an aluminum type bearing, as described above, can be provided with a greatly increased score resistance and improved wear characteristics in high speed applications by coextensively bonding the bearing metal wear layer to the aluminum or aluminum alloy through a thin coating of silver. Inasmuch as the score resistance is substantially improved, there is also a corresponding increase in the tolerance of the bearing for dirt and abrasive particles. Moreover, bearings formed in accordance with the present invention exhibit excellent resistance to overheating, welding or journal seizure in high speed applications.

Referring now to the accompanying drawing in which is illustrated a bearing formed in accordance with the invention:

Fig. 1 is a schematic perspective view of a cylindrical bearing embodying the invention; and Fig. 2 is a sectional view taken along the lines 2—2 of Fig. 1.

More particularly, the illustrated bearing comprises a strong backing member 10 of steel or the like to which is bonded a layer 12 of aluminum or aluminum alloy. A layer 16 of silver is bonded to the aluminum or aluminum alloy through a thin zinc coating 14 formed by applying a solution of sodium zincate over the aluminum-containing layer 12. An outer coating 18 of a bearing metal is deposited on the resultant structure to provide a corrosion resistant wear surface 20.

In the coplating of lead-base alloys onto an aluminum or an aluminum alloy base in accordance with the present invention, the aluminum or aluminum alloy with or without a steel backing is first degreased in a standard cleaner such as hot tri-sodium phosphate, etc. for about 10 to 15 seconds after which it is washed in running water. The next operation consists of an etching of the surface, preferably accomplished at a temperature within the range of about 180° to 200° F. for about 5 seconds in a 10% solution of sodium hydroxide. The bearing is then washed in cold water and any smut or dirt is brushed away.

The bearing is next etched in a 10% solution of hydrofluoric acid at room temperature for about 10 seconds. The bearing is then rinsed in cold water and immersed for about 15 seconds at 90° F. in an aqueous sodium zincate solution having a specific gravity of approximately 1.407 at 70° F.

After this treatment, which provides, in effect, a thin zinc coating on the aluminum or aluminum alloy surface, the bearing is again rinsed in water and is then placed in a silver plating bath as the cathode for a period of about 3 minutes at a current density of about 2 amperes per square foot in order to electrodeposit a coating of silver thereon. In practice, the silver layer should have a thickness of not less than .00001 inch and not in excess of .0001 inch. Superior results are obtained in most instances when the thickness of the silver deposit is within the range of approximately .00003 to .00007 inch, .00005 inch being preferred. The provision of such a silver intermediate layer having a thickness within the above-mentioned limits greatly improves the score resistance in the completed aluminum bearing and provides excellent bearing wear characteristics even under the stresses encountered in modern high compression internal combustion engines.

One formula for a satisfactory silver plating bath is the following wherein the quantities expressed are per liter of water:

| | |
|---|---|
| Silver cyanide | 30 grams. |
| Sodium cyanide | 48 grams. |
| Sodium carbonate | 45 grams. |
| Ammonium thiosulfate | 2 grams. |
| Sodium bicarbonate | Sufficient to adjust the pH to 10.0. |
| Temperature of operation | 85° F.–95° F. |

The silver plated bearing is next rinsed and is then ready for the final plating with a bearing metal.

In the coplating of a specific lead-tin alloy wherein the lead may vary from 90% to 99% and the tin from 10% to 1%, two half bearings are preferably held in circular form and an anode of lead-tin having the desired percentages of constituent metals is placed within, in the proper spacing therefrom. For example, in plating a 3" I. D. bearing, a rotating type anode having a 2" diameter has been found to be suitable. Single half bearings also may be plated providing satisfactory shields are used to insure uniform plate distribution. The electrolyte preferably is a lead-fluoborate-tin-fluoborate solution with gelatin added. For a 95% lead, 5% tin deposit, a ratio of approximately 12 to 1 between the reagents is maintained. Larger additions of gelatin may be used to control the tin deposit. Also, bone glue may be substituted for the gelatin.

During plating, which is carried out at room temperature, the electrolyte should be circulated and constantly filtered. A particular formula for a 12 to 1 electrolyete solution is as follows where the quantities are expressed in ounces per gallon of water:

| | |
|---|---|
| Lead-fluoborate | 12 (metallic lead). |
| Tin-fluoborate | 1 (metallic tin). |
| Gelatin | .5. |

The lead may vary up to 17 ounces per gallon with no deleterious effects. In some instances, where a high corrosion resistance is desired, indium may be substituted for tin or may be subsequently applied to a lead overlay. In such a case the indium should not exceed 7% of the alloy. In certain applications it may be desirable to employ a thin coating of tin over the lead-base alloy.

The thickness of bearing metal coating on the aluminum or aluminum alloy preferably is from .0002 inch up to but not including .001 inch. When lead-base alloy coatings having a thickness less than .001 inch are employed, the lead-base alloy is subjected to little or no fatigue stress and its useful life is limited primarily by its wear resistance. However, in many instances, particularly those encountered in high compression internal combustion engine applications, if the thickness of the lead-base alloy layer is .001 inch or greater, difficulties are encountered because of bearing fatigue in addition to normal bearing wear. Hence, although particular applications permit the use of thicknesses greater than .001 inch, e. g., where the bearing fatigue is not a critical factor, it is preferred to employ a lead-base alloy coating in a thickness of less than .001 inch.

The lead-base alloy coating is deposited at a temperature within the range of about 50° to 110° F., and at a suitable current density, generally within the range from 20 to 75 amperes per square foot. After a satisfactory codeposit is obtained, the bearing is rinsed in cold water, dried, and is ready for use.

Other lead-base alloys may be plated in a similar manner. One of such alloys which is effective as a bearing surface contemplates lead 98.5% to 82%; tin 1% to 15%; and copper .5% to 3%. If an alloy within this range, for example, lead 86%, tin 12% and copper 2%, is desired to be plated, the bath may contain the following ingredients expressed in ounces per gallon:

| | |
|---|---|
| Lead-fluoborate | 11 (metallic lead). |
| Tin-fluoborate | 2 (metallic tin). |
| Copper fluoborate | .25 (metallic copper). |
| Gelatin | .5. |

Here again the thickness of the electrodeposit preferably is within the range of from .0002 inch to .001 inch. As in the case of the above-mentioned lead-base alloy allow the concentration of lead may vary upwards in accordance with the quantity of the tin salt and/or the current density used.

Numerous deviations from the plating procedures set forth herein are obviously possible. The codeposition of other metals such as tin, silver and indium is well known in the art as are methods for preparing material for electroplating. Therefore the specific method of depositing the alloy is not to be a limit in my invention which is directed to an improved composite bearing of aluminum or aluminum alloy having a lead-base bearing alloy surface bonded thereto through a layer of silver.

It will be understood, of course, that the term "silver" as used in the specification and claims is intended to include commercially pure silver as well as silver-base alloys which do not deleteriously affect the bonding of the bearing layers or the characteristics of the bearing metal deposited thereon. Similarly, the expression "aluminum-base alloy" as used in the specification and claims is intended to include alloys containing aluminum in which the aluminum is the principal constituent.

Various changes and modifications of the embodiments of the invention described herein may be made by those skilled in the art without departing from the spirit and principles of the invention.

What is claimed is:

1. A composite bearing comprising an aluminum-containing layer having good bearing properties and including aluminum as a major constituent, and a bearing layer coextensively bonded to said aluminum-containing layer through an extremely thin coating of silver, said thin coating of silver not exceeding about .0001" in thickness.

2. A composite bearing for heavy duty work comprising, in combination, an aluminum-silicon-cadmium alloy layer having good bearing properties, and a bearing layer coextensively bonded to said alloy through a thin coating of silver, said thin coating of silver having a thickness within the range of .00001 to .0001".

3. A bearing comprising an aluminum alloy layer having as essential constituents; cadium .25% to 5%, silicon in quantities of from 1% to 10%, with the remainder being substantially all aluminum, and having coextensively bonded thereto through a coating of silver having a thickness not in excess of about .0001", a layer of a lead-base alloy wherein the lead varies from 90% to 99% of the layer.

4. A bearing comprising an aluminum alloy layer having as essential constituents; cadmium .75% to 1.40%, silicon 3.5% to 4.5% with the remainder substantially all aluminum and having coextensively bonded thereto through a layer of silver having a thickness not in excess of .0001 inch, a coating of a lead alloy layer which has as essential constituents; lead 98.5% to 82%, tin 1% to 15% and copper .5% to 3%.

5. A bearing as in claim 4 in which a thin coating of tin is applied over the lead alloy layer.

6. In a method for making bearings comprising a bearing member including aluminum as its major constituent and having an overlay of a lead-base alloy consisting of at least 82% lead covering one surface of said bearing member, the steps comprising: chemically etching a surface of said bearing member in a caustic solution, superimposing an acid etch upon said cleaned and caustic etched surface, plating the etched surface with a layer of zinc, plating a layer of silver having a thickness not in excess of .0001" on the zinc layer, and finally coplating a bearing alloy onto the surface of said silver, said bearing alloy consisting of lead in quantities of at least 82% therein.

7. In a method for making bearings comprising a bearing member including aluminum as its major constituent and having an overlay of a lead-base alloy consisting of at least 82% lead covering one surface of said bearing member in a thickness less than .001 inch, the steps comprising; preparing the surface of a bearing member for deposition of metal thereon depositing zinc onto one surface of said member by immersion of the member in an aqueous solution of a soluble zinc salt, electrodepositing onto the zinc coated surface a layer of silver having a thickness not in excess of .0001 inch and thereafter codepositing a lead-base alloy containing at least 82% lead onto the silver plated surface.

8. A composite bearing comprising, in combination, an aluminum-containing layer having good bearing properties and including aluminum as a major constituent, and a bearing layer not exceeding .0010 in thickness coextensively bonded to said aluminum-containing layer through a coating of silver, said silver coating having a thickness not over about .0001".

9. A composite bearing comprising a layer of a metal of the class consisting of aluminum and aluminum base alloys having good bearing properties and a bearing layer not exceeding .001" in thickness coextensively bonded to said first mentioned layer through a layer of silver having a thickness within the range of .00001 to .0001".

10. A composite bearing comprising a layer of a metal of the class consisting of aluminum and aluminum base alloys having good bearing properties, an extremely thin layer of zinc on said first layer, a layer of silver on said zinc layer having a thickness not in excess of .0001" and a bearing layer on said silver layer having a thickness not in excess of .001".

References Cited in the file of this patent
UNITED STATES PATENTS

| | | |
|---|---|---|
| 2,171,040 | Merritt | Aug. 29, 1939 |
| 2,386,951 | Howe | Oct. 16, 1945 |
| 2,418,265 | Korpiun | Apr. 1, 1947 |
| 2,586,099 | Schultz | Feb. 19, 1952 |
| 2,586,100 | Schultz | Feb. 19, 1952 |